United States Patent [19]
Christner et al.

[11] Patent Number: 5,162,158
[45] Date of Patent: Nov. 10, 1992

[54] LOW NOISE MAGNETIC THIN FILM LONGITUDINAL MEDIA

[75] Inventors: Jodie A. Christner, Minnetonka; Rajiv Ranjan, Edina, both of Minn.

[73] Assignee: Magnetic Peripherals Inc., Minneapolis, Minn.

[21] Appl. No.: 383,441

[22] Filed: Jul. 24, 1989

[51] Int. Cl.$^5$ .................. H01F 10/16; H01F 10/26
[52] U.S. Cl. ................... 428/611; 428/652; 428/667; 428/668
[58] Field of Search ............. 428/611, 650, 652, 666, 428/667, 668, 928

[56] References Cited

U.S. PATENT DOCUMENTS

| | | | |
|---|---|---|---|
| 4,632,883 | 12/1986 | Howard et al. | 428/668 |
| 4,753,852 | 6/1988 | Mizukami et al. | 428/668 |
| 4,786,564 | 11/1988 | Chen et al. | 428/694 |
| 4,789,598 | 12/1988 | Howard et al. | 428/666 |
| 4,792,497 | 12/1988 | Suzuki et al. | 428/611 |

OTHER PUBLICATIONS

"Magnetic Properties and Longitudinal Recording Performance of Corrosion-Resistant Alloy Films," (Fisher et al.), IEEE Transactions on Magnetics, vol. Mag-22, No. 5, (Sep. 1986).

"A Comparison of the Magnetic and Recording Properties of Sputtered Ternary Alloys for High Density Applications," (Allan et al.) IEEE Transactions on Magnetics, vol. Mag-23, No. 1, (Jan. 1987).

"Low Noise Metal Medium for High-Density Longitudinal Recording", (Christner et al.), J. Appl. Phys., vol. 63, No. 8, (Apr. 15, 1988).

"Noise and Bit Jitter Performance of CoNiPt Thin Film Longitudinal Recording Media and Its Effect on Recording Performance", (Miura et al.), IEEE Trans. Mag.-24 (1988).

"Physical Origin of Limits in the Performance of Thin-Film Longitudinal Recording Media", (Chen et al.), IEEE Trans. Mag.-24 (1988).

"Effects of Ta Addition in CoNi/Cr Double Layer Film Sputtered in Low Ar Gas Pressure", (Kawanabe et al.), IEEE Transaction on Magnetics, vol. 24, No. 6, Nov. 1988.

"Magnetic and Recording Properties of Sputtered Co-P/Cr Thin Film Media", (Natarajan et al.), IEEE Transactions on Magnetics, vol. 24, No. 6, Nov. 1988.

"Dependence of Magnetics, Microstructures and Recording Properties on Underlayer Thickness in Co-NiCr/Cr Media" (Yogi et al.), IEEE Transactions on Magnetics, vol. 24, No. 6, Nov. 1988.

"Thin Films for Magnetic Recording Technology: A Review", (Howard), J. Vac. Sci. Technol. A, vol. 24, No. 1, (Jan./Feb. 1986).

"Noise in High Performance Thin-Film Longitudinal Magnetic Recording Media Invited, " (Belk et al.), IEEE Transactions on Magnetics, vol. Mag-21, No. 5, (Sep. 1985).

(List continued on next page.)

Primary Examiner—George Wyszomierski
Attorney, Agent, or Firm—Frederick W. Niebuhr; Edward P. Heller, III

[57] ABSTRACT

A magnetic thin film recording medium is provided for longitudinal recording of magnetic flux transitions, with the read-back signals enhanced due to a substantial reduction in media noise. The reduced noise level is the result of a unique vacuum deposition process for applying an underlayer to a substrate, prior to deposition of the magnetic thin film. In particular, the underlayer is deposited in a low temperature plasma process under increased pressure of argon or another inert gas and at reduced deposition rates, thus to create voids or interstitial areas which substantially isolate individual grains from their neighboring grains. The subsequently deposited magnetic thin film replicates the crystalline structure and orientation of the chromium underlayer, for relatively isolated grains in the recording layer. This results in lower media noise levels, approaching or equalling those characteristic of particulate media.

15 Claims, 5 Drawing Sheets

OTHER PUBLICATIONS

"Recording and Transition Noise Simulations in Thin Film Media", (Zhu et al.), *IEEE Transactions on Magnetics*, vol. 24, No. 6, (Nov. 1988).

"Read and Write Characteristics of Co-Alloy/Cr Thin Films for Longitudinal Recording", (Shiroishi et al.), *IEEE Transactions on Magnetics*, vol. 24, No. 6, (Nov. 1988).

"Effects of Argon Pressure and Substrate Heating on the Chromium Underlayer Used for High-Density Longitudinal CoNiCr Media", (Ravipati et al.), *J. Vac. Sci. Technol. A,* vol. 5, No. 4, (Jul./Aug. 1987).

"Film Structure and Magnetic Properties of Co-NiCr/Cr Sputtered Thin Film", (Ishikawa et al.), *IEEE Transactions on Magnetics,* vol. Mag-22, No. 5, (Sep. 1986).

"Anisotropy in Thin-Film Media-Origins and Applications (Invited)," (Haines), *J. Appl. Phys.,* (Apr. 15, 1987).

LOW NOISE MAGNETIC THIN FILM LONGITUDINAL MEDIA

BACKGROUND OF THE INVENTION

This invention relates to media for reading and recording magnetic data, and more particularly to a thin film magnetic medium for longitudinal recording.

As media for recording and reading magnetic data, magnetic thin films have gained acceptance and often are preferred over oxide or other particulate media. This is due to favorable magnetic properties in metallic thin films, in particular higher remanence magnetization and coercivity. Higher magnetization levels yield higher amplitude read-back signals for a given film thickness. Higher coercivity increases resistance to demagnetization, for improved long term data storage. Large coercivities also give rise to shorter magnetic transition lengths between data bits, thus increasing maximum storage densities for a given remanence magnetization and film thickness.

A disadvantage associated with magnetic thin films for longitudinal recording is their relatively high levels of noise, resulting in signal-to-noise ratios less than those of particulate media in spite of the enhanced signal amplitudes. Further, the noise power observed for longitudinally recorded thin films is strongly dependent upon the density of written transitions. A primary cause of noise in thin film media is believed to be intergranular coupling in dense, generally continuous films, where exchange coupling and magnetostatic interactions among neighboring grains are relatively strong. This causes distortions of the ideal linear transition between recorded data bits to form irregular or zigzag transitions. Such transitions have been observed by Lorentz microscopy, electron holography, and spin polarized scanning electron microscopy.

In contrast to magnetic thin films, oxide media and other particulate media comprise magnetic particles dispersed in a non-magnetic binding material. With individual particles separated from one another, interactions are greatly reduced. Non-uniformity in particle size, clustering of particles, and surface roughness are the principal sources of noise.

Vertical cobalt chromium magnetic media, in contrast to longitudinally recorded media, exhibit relatively low noise. However, vertical recording requires higher write currents and is not practical for most rigid disk applications.

Those skilled in the art are aware of efforts to improve the noise characteristics of thin film media with data recorded in the longitudinal mode. For example, J. I. Lee, in Paper AB-11 presented at the 1987 Intermag Conference, disclosed that cobalt chromium films (23 percent Cr by weight) deposited by RF-sputtering, ranged from vertical to isotropic-to-longitudinal orientations, all with the CoCr films being approximately 8700 angstroms thick. The isotropic-to-longitudinal medium, recorded in a longitudinal mode, was found to exhibit low noise behavior similar to the vertically recorded medium. However, it had a coercivity of 317 oersteds, much less than desired values of at least 600 oersteds.

Christner et al. ("Low-Noise Metal Medium for High-Density Longitudinal Recording", *Journal of Applied Physics*, Vol. 63, No. 8, Apr. 15, 1988), disclosed that CoCr based ternary thin films deposited on a chromium underlayer exhibited low noise and satisfactory coercivity (1100 oersteds). The film included about 15 percent Cr and up to 10 percent of a third transition metal element. The grain structure of the film replicated that of the chromium underlayer. The coercivity was found to increase sharply with thickness of the chromium underlayer, up to a thickness of about two thousand angstroms. Increasing underlayer thickness also was found to improve the magnetic orientation from isotropic to a preferred longitudinal orientation. It was suggested that the low media noise of the cobalt-chromium based ternary alloy was the result of relatively weak interactions among grains or other magnetic switching sub-units, due to the separation of the cobalt rich regions from one another by non-magnetic regions rich in chromium. This type of separation has been observed for vertical cobalt-chromium media. For such a system, the very strong but short range exchange interactions would be quenched, and the longer range magnetostatic interactions would be decreased.

U.S. Pat. No. 4,786,564 (Chen et al.) discloses a method for manufacturing a magnetic disk with a nickel-phosphorus alloy layer on an aluminum substrate, a second nickel-phosphorus layer sputtered upon the first, and a magnetic alloy sputtered upon the second nickel phosphorus layer. The magnetic alloy is sputtered immediately after sputtering of a previous layer, and is controlled as to the nucleation and growth of the crystalline structure to prevent non-uniformities in the substrate surface from affecting the magnetic characteristics of the magnetic media. The sputtered nickel-phosphorus layer is nearly amorphous and sufficiently thick (e.g. from 5 to 200 nanometers) to prevent non-uniformities in the underlying substrate surface from being transmitted to the magnetic layer.

Further efforts have been directed to improving performance of a metallic recording layer through controlling an underlayer of chromium, although not directed to media noise. For example, Fischer ("Magnetic Properties and Longitudinal Recording Performance of Corrosion-Resistant Alloy Films", Fischer et al., *IEEE Transactions on Magnetics*, Vol. Mag-22, No. 5, September 1986) considers CoCr thin films in comparison to CoCrTa films, particularly as to corrosion resistance and coercivity. Films were sputter deposited in a DC magnetron system, using an argon pressure of ten millitorr. The films were deposited on a chromium underlayer, and the nature of the underlayer, in particular its thickness, was found to influence coercive force. In particular, coercivity was found to increase to a maximum value at a chromium underlayer thickness of five thousand angstroms, with the CoCrTa films significantly higher in coercive force.

Allen ("A Comparison of the Magnetic and Recording Properties of Sputtering Ternary) Alloys for High Density Application", Allen et al., *IEEE Transactions on Magnetics*, Vol. Mag-23, No. 1, January 1987) discloses a number of ternary alloys including CoCrTa, CoNiCr, CoCrW and CoNiW, with chromium atomic percentages ranging from twelve to nineteen percent. These alloys were sputter deposited upon a chromium underlayer using a ten millitorr argon pressure. Coercive force was found enhanced by the third element, and further dependent upon the thickness of the sputtered chromium underlayer.

While the above activity has led to increased understanding of the nature of metallic thin film media utilized for longitudinal recording, there remains the need for a metallic thin film affording the high amplitude read signal and high coercivity characteristics of present continuous grain structures, but with the further advantage of the relatively low noise level of particulate media.

Therefore, it is an object of the present invention to provide a longitudinal metallic thin film exhibiting low noise behavior largely independent of the density of magnetic flux changes.

Another object of the invention is to provide longitudinal thin film media having a coercivity of at least six hundred oersteds and a high remanence and magnetization for a relatively high amplitude read signal, in combination with noise levels characteristic of particulate media.

Yet another object of the invention is to provide a metallic thin film suited for longitudinal recording, having a desirably low percentage of the non-magnetic components of the alloy, yet with individual grains sufficiently isolated from adjacent grains to yield low noise behavior.

SUMMARY OF THE INVENTION

To achieve these and other objects, there is provided a device for storing magnetically readable data including a substantially rigid substrate having a substantially planar substrate surface. A crystalline underlayer is deposited upon the substrate surface to a thickness within the range of from about two hundred to six thousand angstroms. The underlayer has a substantially uniform crystallographic orientation predetermined to control the orientation of crystals subsequently epitaxially grown upon the underlayer. The underlayer is comprised of individual grains having average diameters in the range of from about one hundred to one thousand angstroms. The underlayer is generally parallel to the substrate surface, and is comprised of the grains, along with interstitial regions between neighboring grains. A crystalline recording layer is formed by epitaxial growth of a metallic thin film upon the underlayer. The crystallographic orientation of the underlayer determines the crystallographic orientation of the recording layer whereby the axes of easy magnetization of the crystals of the recording layer are substantially aligned in a plane parallel to the substrate surface. Each individual grain of the recording layer is largely isolated from its adjacent grains in order to significantly reduce the exchange coupling interactions. The width of the interstitial region separating any two adjacent grains is at least three times the crystal lattice constant of the alloy comprising the grain of the recording layer. Collectively, the interstitial regions are in contact with at least fifty percent of the perimeter of each grain. The recording layer is formed to a thickness in the range of from about three hundred to one thousand angstroms.

The underlayer consists essentially of at least one of the following elements: chromium, molybdenum, tungsten, bismuth, niobium, tantalum, vanadium and titanium. The recording layer consists essentially of one of the following alloy formulations:

(a) cobalt at up to ninety-five atomic percent, chromium at from five to eighteen atomic percent, and a third component at from one to twenty percent, said third component consisting essentially of at least one of the following elements: tungsten, tantalum, molybdenum, vanadium, niobium, platinum, bismuth, zirconium, and hafium;

(b) cobalt at up to ninety-three atomic percent, nickel in the range of from five to forty atomic percent, and a third component at from two to twenty atomic percent wherein said third component consists essentially of at least one of the following elements: chromium, tantalum, tungsten, zirconium and platinum; and (c) cobalt and from two to thirty-five atomic percent of a second component consisting essentially of at least one of the following elements: sumarium, yttrium, chromium, nickel, selenium and tungsten.

Preferably the grains in the recording layer make up at most ninety percent of the recording layer, with the interstitial regions making up substantially all of the remainder of the recording layer. More preferably, the grains comprise at most eighty percent with substantially all of the remaining twenty percent of the layer comprising the interstitial regions.

The preferred substrate is a disc formed of aluminum, plated with an alloy of nickel and phosphorous. The underlayer preferably consists essentially of chromium, and is deposited to a thickness of about three thousand angstroms by a DC magnetron sputtering process in an inert gas atmosphere at a pressure in the range of from about ten millitorr to about forty millitorr. More preferably, the inert gas is argon at a pressure of at least fifteen millitorr. The initial temperature of the disc preferably is 100 degrees C. or less at the beginning of the sputtering process.

The chromium underlayer is sputter deposited at a higher argon pressure than heretofore thought desirable. The increased argon pressure increases scattering, for a more random angular deposition, which leads to a faceted rather than acicular structure due to overshadowing effects. Secondly, the greater argon pressure decreases the energy of the chromium atoms arriving at the substrate surface, decreasing the surface mobility and resulting in a voided structure. With greater argon pressure, the deposition rate decreases, which increases the substrate temperature at the end of deposition, leading to increased surface mobility and that counteracts the previously mentioned effect of higher pressure. However, it has been found that the proper selection of argon pressure, in combination with a sufficiently low beginning substrate temperature, results in the desired voided structure in which individual grains are substantially isolated from one another.

A salient feature of the present invention is that by controlling the micro-structure of the chromium underlayer, the micro-structure of the metallic thin film is likewise controlled. More particularly, the magnetic layer replicates the underlayer micro-structure through epitaxial growth of the crystalline film upon the underlayer. Consequently, the metallic thin film may be deposited based on sputtering conditions that permit higher deposition rates that would not otherwise yield the desired spatial isolation, for example sputtering at an argon pressure of about one millitorr.

In general, magnetic properties of the metallic thin films tend to vary with the degree of isolation of individual grains. In particular, the remanence, remanence squareness and coercive squareness all decrease as grain isolation increases. This, of course, has a tendency to reduce the read back amplitudes of data recorded on thin film media having a given thickness.

However, reduced magnetic coupling also leads to a substantial reduction in media noise, principally the result of grain isolation. With sufficient structural or spatial isolation, thin film media recorded in the longitudinal mode have been found to exhibit a media noise level characteristic of typical particulate media, in that the integrated noise power is virtually independent of the recording density in terms of flux changes per inch. As explained below, test results indicate a substantial improvement (from 32 dB to 38 dB) in signal-to-noise ratio in the isolated "quasi-particulate" thin film media as compared to conventional thin film media with a continuous, closely packed grain structure. Thus, in accordance with the present invention the signal-to-noise ratio of longitudinally recorded thin film media is substantially enhanced in spite of somewhat reduced read-back signal amplitudes, due to a substantial reduction in media noise.

IN THE DRAWINGS

For a further understanding of the above and other features and advantages, reference is made to the following detailed description of the invention and to the drawings, in which.

DETAILED DESCRIPTION OF THE PREFERRED EMBODIMENTS

Figure 1:
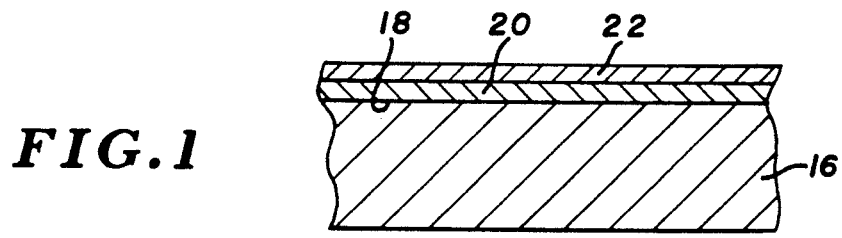
FIG. 1 is a partial sectional view of a thin film recording medium constructed in accordance with the present invention.

Turning now to the drawings, there is shown in FIG. 1 and in partial, sectional view a magnetic medium particularly well suited for the longitudinal magnetic recording of data. The medium includes a substrate 16 in the form of a disc constructed of aluminum plated with an alloy of nickel and phosphorous. In lieu of this preferred choice for substrate 16, other materials may be utilized, for example aluminum, glass, a ceramic material or polyimide.

Substrate 16 has a substantially planar upper surface 18 upon which is applied an underlayer 20 which provides the base for later application of a magnetic thin film. Underlayer 20 preferably consists of chromium, although the underlayer may, as well, be formed of molybdenum, tungsten, bismuth, niobium, tantalum, vanadium or titanium. Combinations of these elements may be employed, although use of a single element is preferred. Underlayer 20 preferably is applied utilizing a vacuum deposition process, for example DC magnetron sputtering, radio frequency (RF) magnetron sputtering, RF diode sputtering or electron beam evaporation.

Magnetic thin film layer 22 is applied directly upon underlayer 20, again employing a vacuum deposition process, and preferably without intervening exposure to any reactive gases in order to preserve the subsequent epitaxy. In general, alloys suitable for forming magnetic thin film recording layer 22 are categorized as follows:

(1) an alloy of cobalt, chromium and a third component (CoCrX) in which the chromium is present at from five to eighteen atomic percent and X is present at from one to twenty atomic percent, where X includes one of the following elements: tungsten, tantalum, molybdenum, vanadium, niobium, platinum, bismuth, zirconium, hafium, or a combination of two or more of these elements;

(2) cobalt, nickel and a third component (CoNiX) where nickel is present at from five to forty atomic percent and X is present at from two to twenty atomic percent, with X being one of the following elements: chromium, tantalum, tungsten, zirconium and platinum; and (3) an alloy including cobalt and a second element (CoX) where X is present at from two to thirty-five atomic percent and consists of one of the following elements: sumarium, yttrium, chromium, nickel, selenium and tungsten.

Component X in each of the these cases may include more than one of the listed elements. However, as was the case with underlayer 20, a single element is preferred.

Preferably the alloy used is from one of the first two categories, as ternary alloys have been found to have substantially enhanced coercivity as compared to the third category alloys with only two elements. More particularly, first and second category alloys found particularly desirable include CoCrTa with chromium at about fourteen atomic percent and tantalum at about three atomic percent, and CoNiCr with nickel at about twenty-five atomic percent and Cr at about five atomic percent. It may be appreciated that dual sided media would involve these same layers applied to both sides of substrate 16.

Figure 2:
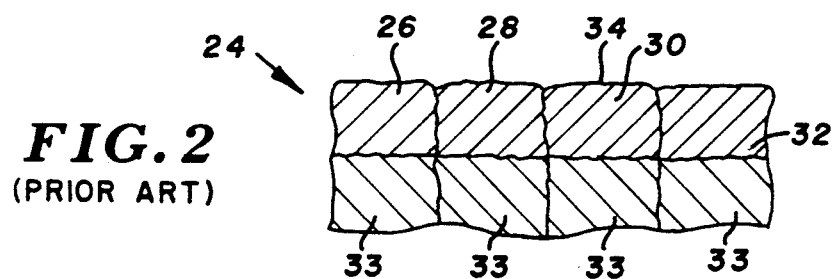
FIG. 2 is an enlarged view of a magnetic thin film of a recording medium such as that illustrated in FIG. 1, but formed according to prior art techniques.

FIG. 2 is a schematic representation of conventional magnetic thin film layer 24 enlarged sufficiently to show individual grains 26, 28, 30 and 32 of a magnetic layer, closely packed against one another above chromium grains 33 to form a substantially continuous upper surface 34. This close packed structure is considered desirable for longitudinal recording of magnetic transitions in magnetic thin film 24, as it permits recording at a high frequency or density of magnetic flux transitions and yields high amplitude read-back signals. This structure, however, usually also results in high noise. The principal cause of noise is believed to be exchange coupling and magnetostatic coupling between adjacent grains. Strong coupling results in distortions of the transition, or zigzag walls, between regions of opposite magnetic orientation and leads to relatively high media noise. The magnetic coupling forces between the adjacent grains can be reduced by increasing the proportion of non-magnetizable constituents in the magnetic thin film, for example by increasing the amount of chromium in a CoNiCr thin film. This, however, yields a film of reduced remanence magnetization and therefore reduced playback signal amplitude.

Figure 3:
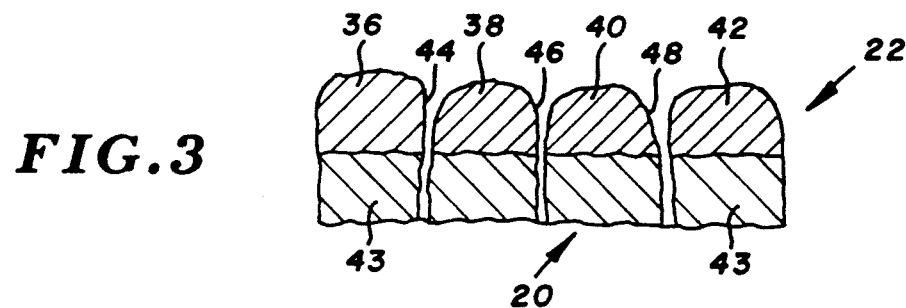
FIG. 3 is an enlarged view of the magnetic thin film layer illustrated in FIG. 1.

FIG. 3 is a schematic illustration similar to that in FIG. 2, but showing grains 36, 38, 40 and 42 of magnetic thin film recording layer 22, deposited on chromium layer 20 including grains 43 in accordance with the present invention to provide a spatial or structural separation of the grains, in the form of voids or interstitial regions 44, 46 and 48. Consequently the grains 36-42 are separated from one another by the voids, which substantially reduces magnetic coupling forces, especially the short range exchange coupling. This has been found to slightly reduce read-back signal amplitudes. More importantly, however, this structure has been found to substantially reduce media noise, thus leading to enhanced signal-to-noise ratios for enhanced readability of longitudinally recorded data.

Figure 4:
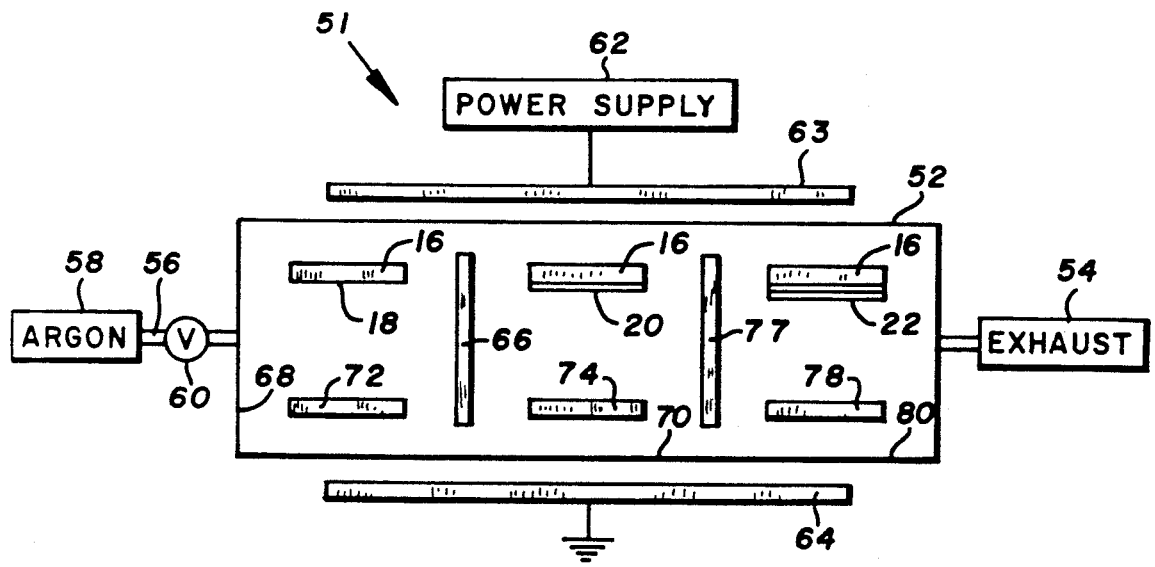
FIG. 4 is a schematic illustration of the deposition apparatus utilized in forming the recording medium of FIG. 1.
Figure 5:
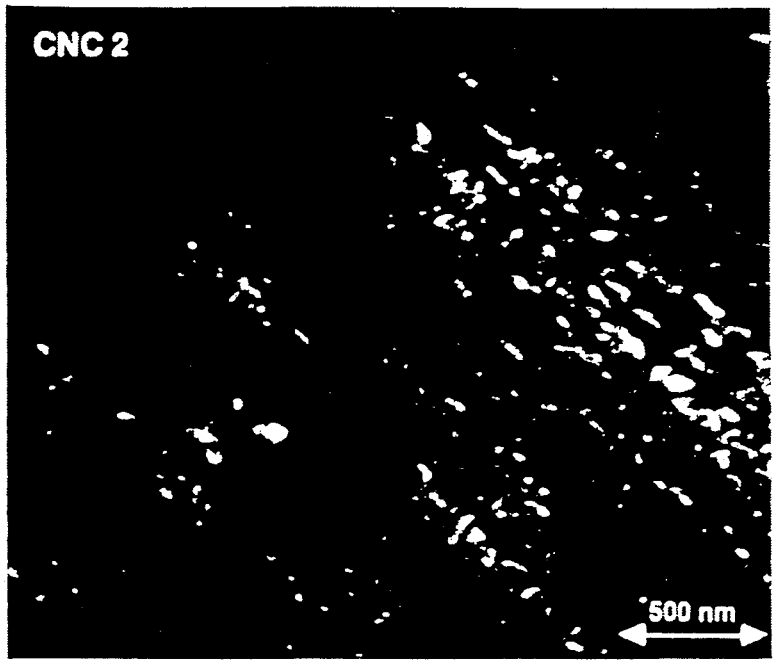
FIGS. 5-9 are SEM photographs of magnified images of recording media, particularly surfaces of metallic thin films formed by DC magnetron sputtering of underlayers under selectively varied conditions.
Figure 6:
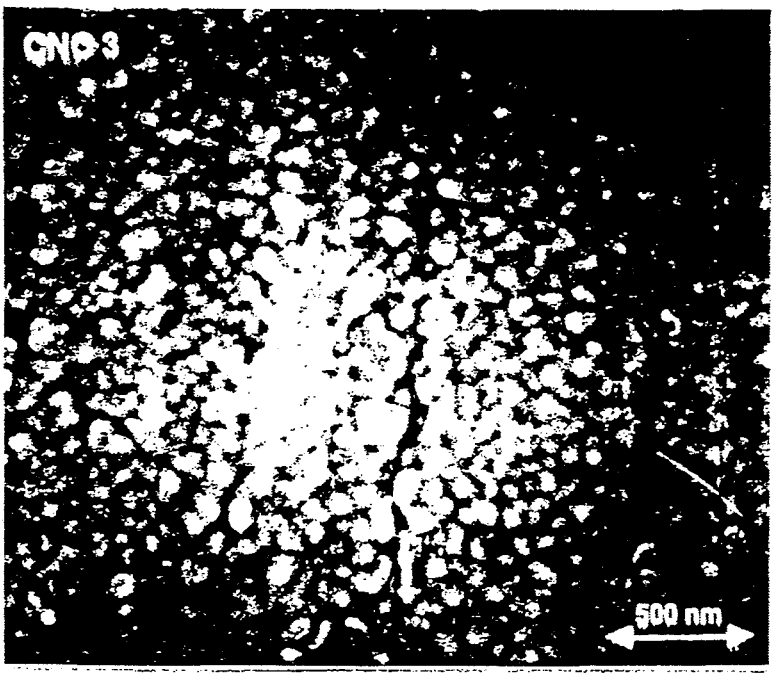
Figure 7:
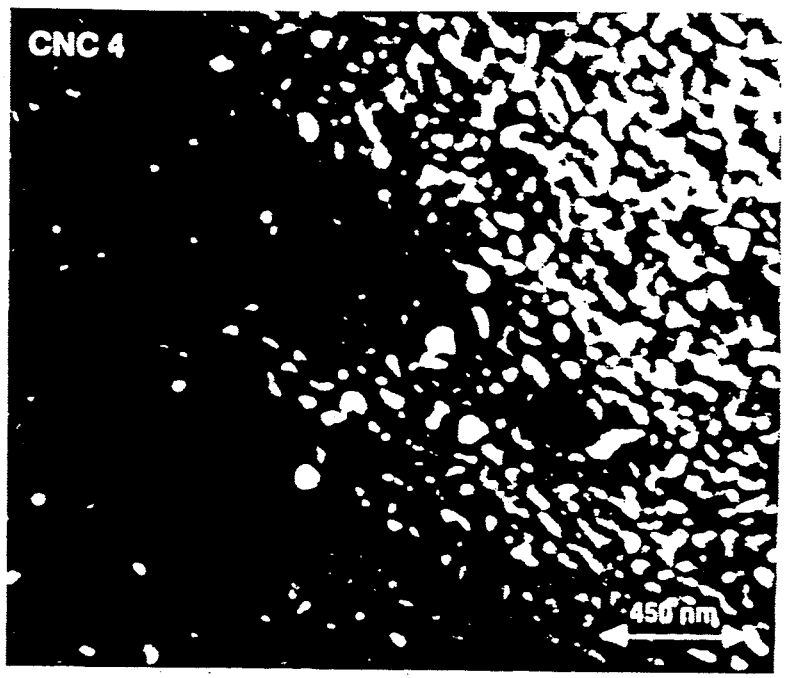
Figure 8:
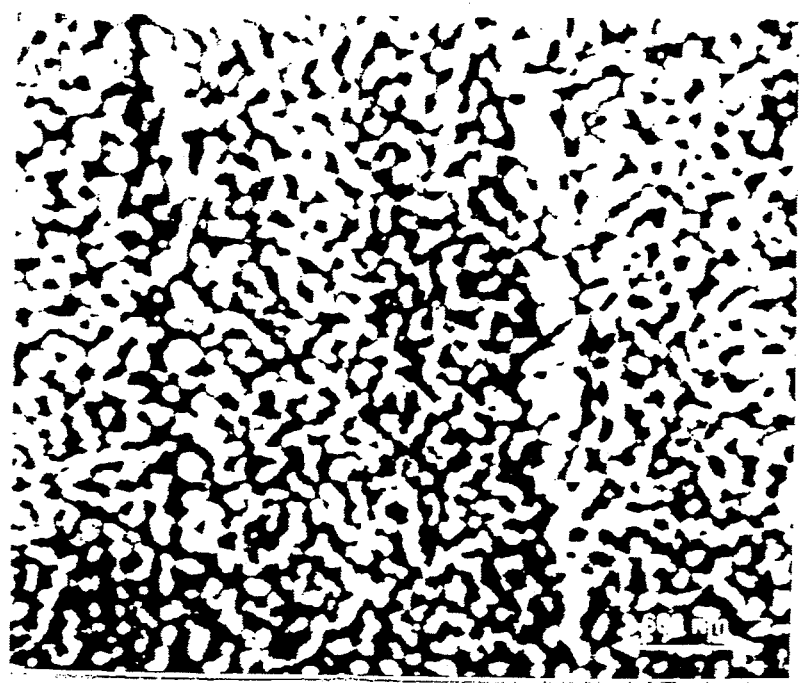
Figure 9:
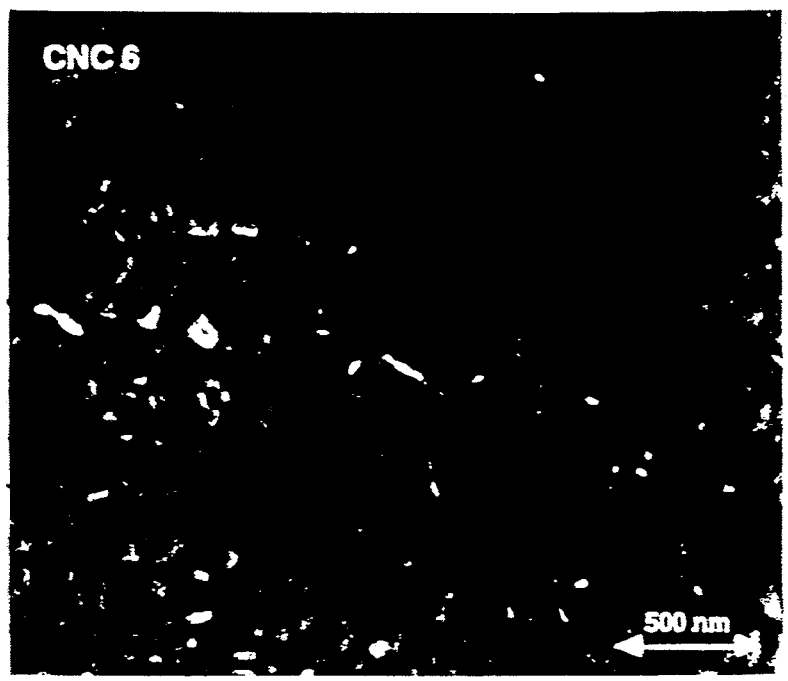

The grain structure illustrated in FIG. 3 is achieved through changes in the vacuum deposition of underlayer 20, as previously mentioned preferably chromium. The same vacuum deposition apparatus may be used in applying underlayer 20 and magnetic thin film 22. One preferred example of such apparatus is schematically illustrated at 51 in FIG. 4. The apparatus includes a fluid tight DC magnetron sputtering or plasma chamber 52 in which a plurality of substrates 16 are enclosed, with upper surfaces 18 of the substrates facing downwardly. The apparatus further includes an exhaust pump 54 in fluid communication with chamber 52 for evacuating the chamber when desired. Also in fluid communication with the chamber, through a line 56, is a container 58 for supplying an inert gas, preferably argon, to the chamber. A valve 60 along line 56 controls the supply of argon to plasma chamber 52. A power supply 62 biases an electrode 63 with respect to a ground electrode 64 to generate the electrical field necessary to ionize the argon in chamber 52.

A partition 66 divides plasma chamber 52 into separate subchambers 68 and 70. In subchamber 68, a chromium target 72 is positioned in the chamber in spaced apart relation to the most leftward of substrates 16, facing surface 18 of the substrate. In subchamber 70, a target 74 of an appropriate magnetic alloy, e.g. cobalt-/nickel/chromium is positioned spaced apart from and facing surface 18 of the center substrate. Preferably, targets 72 and 74 are parallel to surfaces 18 of the corresponding substrates.

Plasma chamber 52 is utilized to apply both underlayer 20 and thin film layer 22 to each of the substrates, due to the need to avoid intervening exposure to any reactive gases, thus to enhance the epitaxial growth of the thin film layer, replicating the microstructure of the underlayer. Partition 66 facilitates application of both layers in a single chamber as it prevents cross contamination.

In order to apply chromium underlayer 20 to substrate 16, exhaust pump 54 is actuated to substantially evacuate plasma chamber 52. Following evacuation, valve 58 is opened to supply argon to the chamber, until pressure within the chamber reaches a predetermined value, e.g. ten millitorr. At this point the substrates may be heated as well, if desired. With argon at the desired pressure, target input power at a desired level, for example 4.5 watts per square centimeter, is supplied to electrode 63 to generate an electrical field and ionize the argon, forming an argon plasma within the chamber. Interaction of the argon ions with chromium target 72 generates chromium atoms, a sufficient number of which bombard and become chemically attached to the leftwardmost substrate 16, to form the chromium underlayer.

Following deposition of underlayer 20 to a selected thickness, the substrate and underlayer are transferred from subchamber 68 into subchamber 70. Argon pressure within plasma chamber 52 is held constant, or adjusted as appropriate if thin film layer 22 is to be sputtered at a different argon pressure than underlayer 20. Power supply 62 is activated to generate the required electrical field once again. In subchamber 70, argon ions interact with target 74 to generate chromium, nickel and cobalt atoms, which become chemically attached to the underlayer 20 previously deposited onto the substrate. Vacuum deposition proceeds until magnetic thin film recording layer 22 has been applied to its desired thickness.

Finally, a carbon overcoat is applied, directly over magnetic thin film layer 22. For this purpose, a partition 77 is utilized to provide a subchamber 80 within plasma chamber 52, and substrate 16 is positioned spaced apart from a carbon target 78, so that thin film layer 22 faces and is parallel to the carbon target.

The properties of the magnetic thin film recording layer 22 are controlled to a substantial degree by controlling the nature of underlayer 20. In particular, by deposition of chromium underlayer 20 to form voids or interconnected interstitial volumetric regions between grains, similar voids are formed between grains in the subsequently applied magnetic thin film. Underlayer 20 and thin film layer 22 are both highly crystalline, and the crystalline arrangement and orientation in the magnetic thin film layer tends to replicate the arrangement and orientation in the underlayer, through epitaxial growth.

Thus, an essential feature of the present invention is to form an underlayer in which individual grains are partially or fully isolated from their neighboring grains. The shape of the grains may be round, polygonal or elongated, and grain sizes can range from one hundred to one thousand angstroms in diameter for substantially round grains and from one hundred to two thousand angstroms for elongated grains. The thickness of underlayer 20 can be in the range of from about two hundred to about six thousand angstroms. More preferably, the thickness is within the range of from about one thousand to four thousand angstroms, and a highly preferred underlayer thickness, in particular for a chromium underlayer, is three thousand angstroms.

In general, the desired spatial isolation in the chromium underlayer is the result of careful selection of deposition parameters, in particular the argon pressure, substrate temperature and sputtering rate.

In connection with DC magnetron sputtering, argon pressure should be in the range of from ten to forty millitorr, and preferably should be at least fifteen millitorr. Similar argon pressure ranges are preferred for RF magnetron sputtering and RF diode sputtering, being ten to one hundred millitorr and ten to thirty millitorr, respectively. For electron beam evaporation, preferred background pressure levels are significantly lower, in the range of from $10^{-2}$ to $10^{-4}$ millitorr.

The desired physical separation between grains is achieved also by deposition at lower rates than previously thought desirable. For example, DC magnetron and RF magnetron sputtering preferably occur at from ten to fifty angstroms per second, RF diode/triode sputtering at 0.5 to 10 angstroms per second, and electron beam evaporation at ten to forty angstroms per second.

The third parameter controlling micro-structure of the chromium underlayer is the temperature of substrate 16, with lower temperatures preferred. In particular, while the substrate may have a temperature up to 200 degrees C. at the beginning of deposition, much lower temperatures are preferred, for example about 100 degrees C. or in some cases the complete absence of substrate preheating.

For the magnetic thin film recording layer, deposition conditions are not critical, since the magnetic layer grain structure will replicate that of the underlayer. However, preferred ranges are involved with this layer as well.

For example, relatively lower argon pressure is desirable, the preferred range in connection with DC magnetron sputtering being from one to ten millitorr. Similar ranges are preferred in connection with RF magnetron and RF diode/triode sputtering, respectively one to thirty millitorr and one to ten millitorr. When the magnetic recording layer is applied by electron beam evaporation, substantially the same background pressure is used as with the underlayer, namely $10^{-2}$ to $10^{-4}$ millitorr.

While an RF or a DC external bias can be used during application of the magnetic thin film recording layer, the preferred deposition rates are relatively low, for example from five to twenty angstroms per second in connection with DC magnetron sputtering. RF magnetron and RF diode/triode sputtering have similarly low preferred deposition ranges, respectively five to twenty angstroms and 0.5 to 5 angstroms per second. The preferred range for electron beam evaporation is one to twenty angstroms per second. Regardless of the deposition approach, the preferred thickness of magnetic thin film layer 22 is in the range of three hundred to one thousand angstroms, with a particularly preferred thickness in the range of five hundred to seven hundred angstroms for CoNiCr alloys.

While the deposition parameters discussed above are particularly important in the application of underlayer 20, it is to be understood that they are provided as guidelines and not necessarily resulting in a particular grain structure. The preferred argon pressure varies with the method of sputtering as noted above, but further is subject to variance depending upon the vacuum deposition equipment involved, as is well known to those skilled in the art. Preferred values within the suggested ranges can vary with the particular materials selected for underlayer 20, as well as with the alloy selected for the magnetic thin film. With this in mind, however, it has been found that individual grains of the underlayer, and the magnetic thin film, are sufficiently structurally isolated if the thin film media is comprised of at most ninety percent grains of the selected alloy, with the interstitial regions or voids comprising the remainder of the surface area, i.e. at least ten percent.

To demonstrate the manner in which carefully selected deposition parameters for chromium underlayer 20 can influence the structure and magnetic properties of the magnetic thin film recording layer, five aluminum/nickel phosphorous substrates were subjected to DC magnetron sputtering, in each case to apply an underlayer of chromium to a thickness of three thousand angstroms, followed by application of a CoNiCr magnetic thin film, to a thickness of five hundred fifty angstroms. The thin film material included nickel at twenty-five atomic percent and chromium at five percent. The chromium underlayer was applied under the following conditions, with the examples identified as A–E:

EXAMPLE A

The substrate was preheated to a temperature of 100 degrees C., the argon pressure was one millitorr, and the deposition rate was 59.6 angstroms per second.

EXAMPLE B

The substrate was preheated to a temperature of 200 degrees C., the argon pressure was nine millitorr, and the deposition rate was 40.4 angstroms per second.

EXAMPLE C

The substrate was preheated to a temperature of 100 degrees C., the argon pressure was nine millitorr, and the deposition rate was 13.7 angstroms per second.

EXAMPLE D

The substrate was not preheated, the argon pressure was seventeen millitorr, and the deposition rate was 39.6 angstroms per second. Power was increased for a higher deposition rate.

EXAMPLE E

The substrate was not preheated, the argon pressure was twenty-five millitorr, and the deposition rate was 13.7 angstroms per second.

In each case, the magnetic thin film was applied immediately after application of the underlayer, at an argon pressure of one millitorr.

It should be noted that Examples D and E are in accordance with the present invention, while Examples A–C are comparative examples that illustrate the manner in which process parameters influence microstructure.

The variations in structure of Examples A–E can be seen from FIGS. 5–9, each being a magnified image (40,000 times to 50,000 times) of the upper surface of the magnetic thin film, obtained using a scanning electron microscope with secondary electron imaging. It should be noted that Examples A–E originally were each provided with a carbon overcoat typically about three hundred angstroms thick for measurement of recording properties. In each case, the carbon coating was removed prior to scanning electron microscope observation, by a low temperature plasma etch in a mixture of argon and oxygen. Based on comparison with samples to which no carbon overcoat had been applied, it has been found that the carbon overcoat can be removed without altering the micro-structure of the magnetic thin film.

Examination of FIGS. 5–9 reveals differences in micro-structure of the magnetic thin film in Examples A–E. In Example A (FIG. 5), individual grains are elongated having a length of about one thousand angstroms and width or diameter of about three hundred angstroms, and are densely packed. Likewise, the grains in Example B (FIG. 6) are densely packed, although individual grains are round, with diameters varying from about seven hundred fifty to fifteen hundred angstroms. The grains of Example C (FIG. 7) are elongated, with lengths of about eighteen hundred angstroms and diameters of about five hundred angstroms, and randomly dispersed, for a partial separation between neighboring grains.

The grains in Example D (FIG. 8) are rounded, having an average diameter of about nine hundred angstroms, and also appear separated from one another. Similarly, the grains in Example E (FIG. 9) are isolated from neighboring grains, and have average diameters of about one thousand angstroms, although the grains appear to be polygonal in shape rather than rounded.

Examples A–E illustrate the effects of argon pressure and initial substrate temperature upon the magnetic thin film micro-structure. First, an increased argon pressure causes random angular deposition due to increased scattering of ions. This results in a faceted rather than acicular structure due to overshadowing effects. Secondly, increased argon pressure results in less energy of the atoms arriving at the substrate surface. This decreases surface mobility and results in a more voided structure. The deposition rate decreases with increasing argon pressure. On the other hand, surface mobility increases with substrate temperature, and higher surface mobility causes more coalescence thus tending toward a more continuous film. The comparison of Examples A and B illustrates this feature.

Magnetic properties of Examples A–E were determined using a vibrating sample magnetometer (VSM), and reveal differences in magnetic behavior among the examples corresponding to differences in their microstructure, as seen from the following table:

TABLE

| Example | Ms. (emu/cm$^3$) | Hc (Oe) | S | S* | $V_0$ ($\mu$Vp-p) | SNR (dB) |
|---|---|---|---|---|---|---|
| A | 764 | 900 | 0.81 | 0.82 | 587 | 32.2 |
| B | 879 | 1060 | 0.83 | 0.88 | 599 | 34.8 |
| C | 799 | 1040 | 0.74 | 0.82 | 470 | 36.3 |
| D | 484 | 1000 | 0.72 | 0.68 | 280 | 38.3 |
| E | 824 | 800 | 0.62 | 0.67 | 425 | 38.4 |

The remanence squareness (S) and coercive squareness (S*) both decrease as the degree of grain isolation increases, from Example B (most continuous) to Example E (most isolated). The coercivity ($H_c$) does not appear to be as closely related to grain separation, although Example B does have the highest value while Example E has the lowest. While the relationship between degree of grain isolation and coercivity is not fully understood, it appears that higher argon pressure, and the resulting increase in isolation, also may give rise to low spacing planes, e.g. (220) type and (310) type as opposed to the (110) type orientation preferred for chromium, particularly when provided as an underlayer for a cobalt based magnetic layer.

The table also lists results of recording performance studies. In particular the peak-to-peak playback signal amplitude ($V_0$) measured for an all-ones pattern recorded at low density (2500 flux changes per inch), and the signal-to-noise ratio (SNR). The recording head used had a 15 turn coil, track width of 24 micrometers, a gap length of 0.58 micrometers, and top and bottom pole lengths of 1.27 micrometers and 1.52 micrometers, respectively. The flying height of the head was 0.15 micrometers and the relative head-to-medium velocity was 13.9 meters per second. The SNR was computed using $V_0$ divided by 2 and the maximum media noise voltage.

The media noise voltage was obtained as a function of data density as described by N. R. Belk et al. ("Measurement of the Intrinsic Signal-to-Noise Ratio for High-Performance Rigid Recording Media" *J. Appl. Phys.*, Vol. 59, No. 2, pp. 557–563, 1986). Briefly, the method was as follows: First the head and electronics noise level was measured using a spectrum analyzer. (The noise was a constant value, independent of frequency.) Then an all-ones data pattern was written on the disk at a specified frequency, say $f_0$, and the read back spectrum was taken using the spectrum analyzer. In addition to a broad noise envelope, sharp peaks were observed at the data frequency ($f_0$) and its harmonics ($f_0$, $2f_0$, $3f_0$, ...). A computer algorithm was used to smooth the peaks so that only the noise envelope remained. The difference between the total noise power envelope and the head and electronics noise contributions was integrated from 0.5 Hz to 20.5M Hz to obtain the root-mean-square noise voltage.

Figure 10:
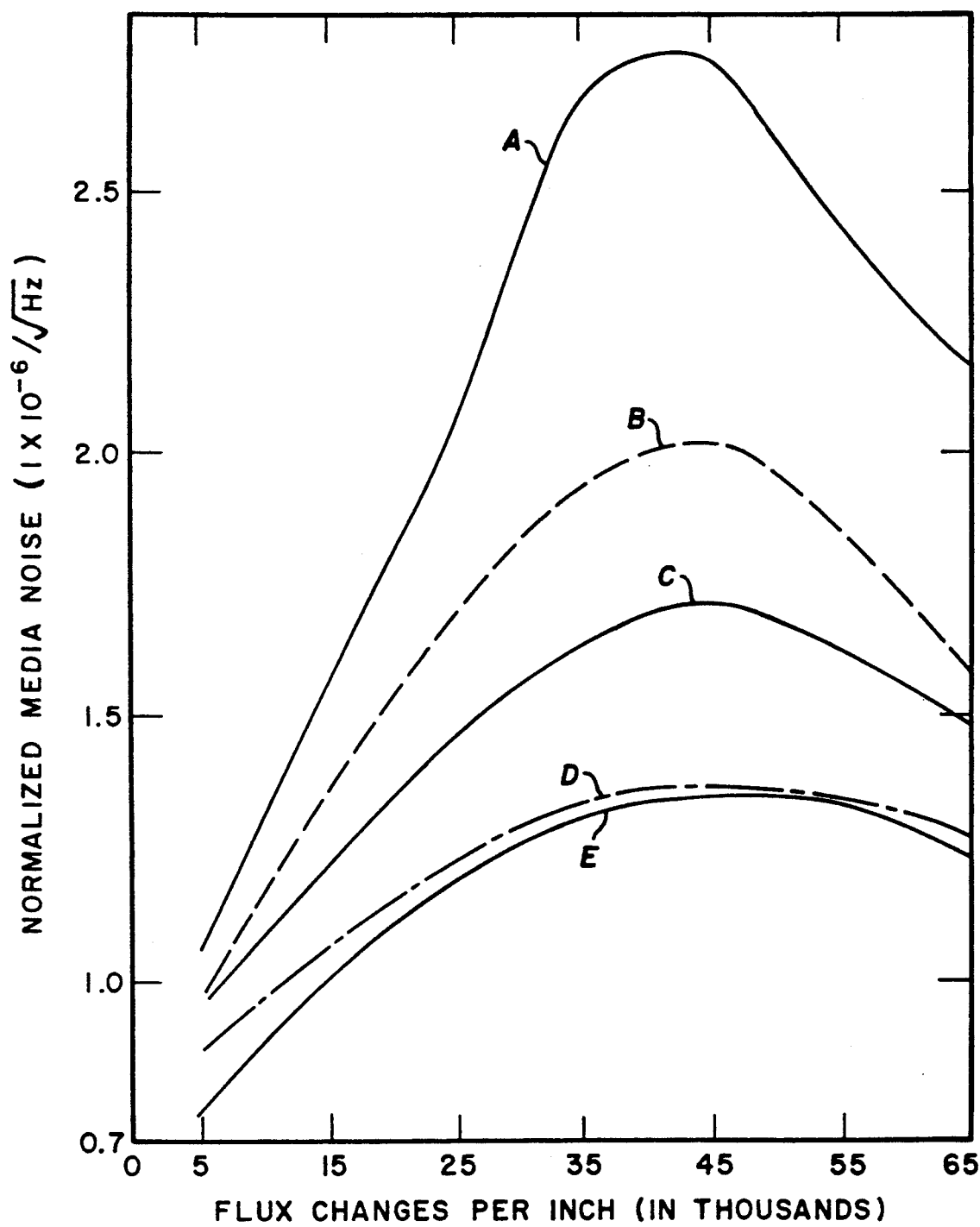
FIG. 10 is a plot of media noise power normalized by the signal amplitude as a function of the frequency of the written signal, for the media photographed in FIGS. 5-9.

The graph in FIG. 10 shows media noise power (normalized by dividing by the low density playback amplitude, $V_0$) as a function of data density in terms of thousands of flux changes per inch. The curve for Example A exhibits behavior typical of conventional thin film longitudinally recorded media in that the noise level is relatively high and increases sharply with increasing frequency to a peak, in this case at approximately forty thousand flux changes per inch. Examples D and E, in contrast, behave more as typical particulate media; they exhibit significantly lower noise power, and noise power is much less dependent upon frequency.

Returning to the table, it is clear that signal output, considered alone, is superior in Examples A and B. On the other hand, signal-to-noise ratio increases dramatically, from thirty-two decibels in connection with Example A, to over thirty-eight decibels for Examples D and E. Thus, deposition of the chromium underlayer, under conditions which cause grain isolation in the magnetic thin film recording layer, substantially improves magnetic thin film media despite a lower amplitude read-back signal, principally due to substantial reduction in noise.

What is claimed is:

1. A device for storing magnetically readable data, including:
    a substrate having a substantially planar substrate surface;
    a crystalline underlayer deposited upon said planar base surface to a thickness within the range of from about two hundred to six thousand angstroms, said underlayer having a substantially uniform crystallographic orientation to control the orientation of crystals epitaxially grown upon the underlayer, said underlayer comprised of individual grains having average diameters in the range of from about one hundred to one thousand angstroms; and
    a crystalline recording underlayer formed by epitaxial growth of a metallic thin film upon said underlayer, the crystallographic orientation of said recording layer being determined by the crystallographic orientation of said underlayer whereby the axes of easy magnetization of the crystals comprising said recording layer are substantially aligned in a plane parallel to said planar base surface, said recording layer being generally parallel to said substrate layer and comprised of individual grains of said recording layer, and of continuous and interconnected interstitial regions between adjacent grains whereby each grain is substantially isolated from its adjacent grains in order to significantly reduce exchange coupling interactions between neighboring grains, with the width of any one of said interstitial regions separating adjacent grains being at least three times the crystal lattice constant of the alloy comprising the grains, said interstitial regions comprising at least ten percent of the recording layer, said recording layer being formed to a thickness in the range of from about three hundred angstroms to about one thousand angstroms;
    wherein said underlayer consists essentially of at least one of the following elements: chromium, molybdenum, tungsten, bismuth, niobium, tantalum, vanadium, and titanium; and wherein said recording layer consists essentially of one of the following alloys:

(a) cobalt at up to ninety-five atomic percent, chromium at from five to eighteen atomic percent, and a third component at from one to twenty atomic percent and consisting of at least one of the following elements: tungsten, tantalum, molybdenum, vanadium, niobium, platinum, bismuth, zirconium, and hafnium;

(b) cobalt at up to ninety-three atomic percent, nickel in the range of from five to forty atomic percent, and a third component from two to twenty atomic percent and consisting essentially of at least one of the following elements: chromium, tantalum, tungsten, zirconium and platinum; and (c) cobalt and from two to thirty-five atomic percent of a second component consisting essentially of at least one of the following elements: sumarium, yttrium, chromium, nickel, selenium and tungsten.

2. The data storage device of claim 1 wherein:
the grains of said recording layer comprise at most ninety percent of said recording layer, with the interstitial regions comprising substantially all of the remainder of said recording layer.

3. The data storage device of claim 2 wherein:
the interstitial regions of the recording layer comprise at least twenty percent of said recording layer.

4. The data storage device of claim 1 wherein:
said underlayer consists essentially of chromium.

5. The data storage device of claim 4 wherein:
said grains of said recording layer are substantially rounded in shape.

6. The data storage device of claim 4 wherein:
said grains of said recording layer are polygonal in shape.

7. The data storage device of claim 4 wherein:
said grains of said recording layer are elongated, having lengths from one hundred to two thousand angstroms and widths ranging from one hundred to one thousand angstroms.

8. The data storage device of claim 4 wherein:
said has been deposited to a thickness of about three thousand angstroms by DC magnetron sputtering in an inert gas atmosphere at a predetermined pressure in the range of from about ten millitorr to about forty millitorr, and with the initial temperature of said base being at most 100 degrees C.

9. The data storage device of claim 4 wherein:
said underlayer has been deposited to a thickness of approximately three thousand angstroms by DC magnetron sputtering in an argon atmosphere at a predetermined pressure in the range of from fifteen millitorr to forty millitorr, and an initial temperature of said substrate of at most 200 degrees C.

10. The data storage device of claim 4 wherein:
said recording layer consists of cobalt, nickel and chromium, with said chromium comprising from two to ten atomic weight percent.

11. The data storage device of claim 4 wherein:
said recording layer has been deposited to a thickness of about five hundred fifty angstroms by a DC magnetron sputtering process in an inert gas atmosphere at a pressure of at most twenty millitorr.

12. The data storage device of claim 1 wherein:
said recording layer consists of cobalt, nickel and chromium, with said chromium comprising from two to ten atomic percent.

13. The data storage device of claim 12 wherein:
said recording layer has been deposited to a thickness of about five hundred fifty angstroms by DC magnetron sputtering in an inert gas atmosphere at a pressure of at most twenty millitorr.

14. The data storage device of claim 1 wherein:
said substrate is constructed of an alloy including aluminum.

15. The data storage device of claim 14 wherein:
said substrate is a disc constructed of aluminum and plated with an alloy of nickel and phosphorous.

* * * * *

UNITED STATES PATENT AND TRADEMARK OFFICE
CERTIFICATE OF CORRECTION

PATENT NO. : 5,162,158

DATED : November 10, 1992

INVENTOR(S) : Jodie A. Christner, et al.

It is certified that error appears in the above-identified patent and that said Letters Patent is hereby corrected as shown below:

Claim 8, column 14, line 2, after the word "said", insert -- underlayer --;

Claim 10, column 14, line 4, delete the word "weight";

Signed and Sealed this

Nineteenth Day of April, 1994

*Attest:*

BRUCE LEHMAN

*Attesting Officer*     *Commissioner of Patents and Trademarks*